United States Patent [19]

Hucker et al.

[11] Patent Number: 4,517,483
[45] Date of Patent: May 14, 1985

[54] PERMANENT MAGNET ROTOR WITH SATURABLE FLUX BRIDGES

[75] Inventors: David J. Hucker; Donald A. Straznickas, both of Rockford, Ill.

[73] Assignee: Sundstrand Corporation, Rockford, Ill.

[21] Appl. No.: 565,345

[22] Filed: Dec. 27, 1983

[51] Int. Cl.³ ............................................. H02K 21/12
[52] U.S. Cl. .................................................... 310/156
[58] Field of Search ............... 310/156, 261, 181, 186, 310/216–218, 162, 163, 264, 265

[56] References Cited

U.S. PATENT DOCUMENTS

| | | |
|---|---|---|
| 2,488,437 | 11/1949 | Schaefer ............................ 310/156 |
| 2,503,017 | 4/1950 | Wisman ............................. 310/156 |
| 2,863,077 | 12/1958 | Morrill .............................. 310/156 |
| 3,169,203 | 2/1965 | Lavin et al. ....................... 310/156 |
| 3,334,254 | 8/1967 | Kober ................................ 310/156 |
| 3,411,027 | 11/1968 | Rosenberg ...................... 310/156 X |
| 3,445,700 | 5/1969 | Prange et al. .................... 310/156 |
| 3,508,094 | 4/1970 | Byrne .............................. 310/156 X |
| 4,260,921 | 4/1981 | Silver .............................. 310/156 |
| 4,417,168 | 11/1983 | Miller et al. .................... 310/156 |

Primary Examiner—Mark O. Budd
Attorney, Agent, or Firm—Wood, Dalton, Phillips, Mason, & Rowe

[57] ABSTRACT

A rotor structure for a permanent magnet generator, or PMG, includes a plurality of spaced apart magnets and magnetic circuit elements in series with the magnets on the rotor to act as flux limitation means to thereby limit the output voltage of the permanent magnet generator at low current levels.

10 Claims, 10 Drawing Figures

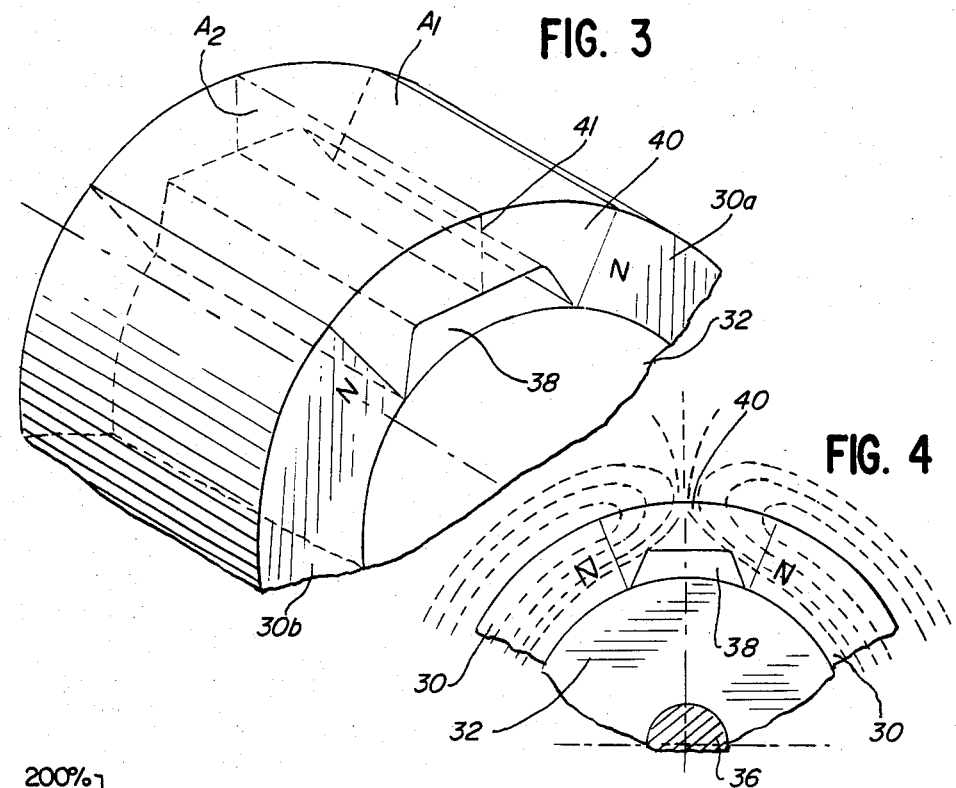
FIG. 3
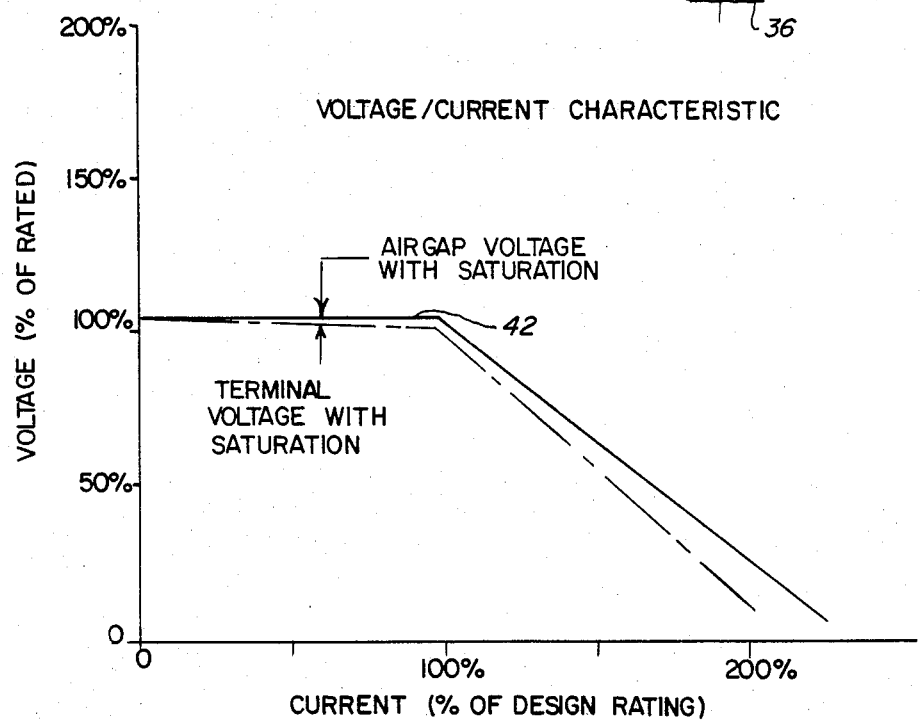
FIG. 4
FIG. 5

PERMANENT MAGNET ROTOR WITH SATURABLE FLUX BRIDGES

DESCRIPTION

1. Technical Field

The present invention relates generally to dynamoelectric machines and more particularly to a structure for a permanent magnet machine or generator.

2. Background Art

Permanent magnet generators, or PMG's, are inherently more efficient than wound rotor machines due to the fact that the PMG has only one winding which experiences copper losses as opposed to wound rotor machines which have multiple windings experiencing such losses.

The recent development of high energy permanent magnet materials has aided in the design of permanent magnet generators, particularly those which are to be used in environments requiring low weight and high performance. However, the inherent nature of these high energy materials is that a large voltage drop occurs as load is applied. For example, if the PMG is run at a constant speed and is proportioned to operate near the maximum energy product of the magnets at maximum power, the output voltage at no load (i.e. the open circuit voltage) may be approximately 170% of rated voltage.

Hence, PMG's have typically been utilized only as an auxiliary power source, for example, in a brushless alternator to supply field current to an exciter which in turn develops main field current for a generator. Even when used as an auxiliary power source, a voltage regulator is required to ensure that the PMG output is maintained at a substantially constant level.

There have been various attempts to design improved rotor assemblies for permanent magnet generators. For example, each of McCarty et al U.S. Pat. No. 4,242,610, Silver U.S. Pat. No. 4,260,921 and Burgmeier et al U.S. Pat. Nos. 4,296,544 and 4,302,693 discloses a rotor assembly wherein tangentially magnetized magnets are separated by support members. The support members have a plurality of generally equally spaced holes disposed near the periphery thereof to reduce the rotor mass and presumably allow the rotor to operate at high speeds. It is noted in these patents that the size and location of the holes are established with regard to magnetic and structural considerations. However, there is not even a recognition in these patents of the problem of variations in output voltage with changes in load current, and hence, no solution to this problem is proposed in any of these patents.

DISCLOSURE OF INVENTION

In accordance with the present invention, a rotor structure for a permanent magnet generator, or PMG, includes means for limiting the voltage at low current below a desired level.

In a first embodiment of the invention, a series of tangentially magnetized magnets are equally spaced about the periphery of a nonmagnetic hub. Disposed in the space between magnets is means for limiting the flux developed by the magnets. In this first embodiment, flux is limited by placing a ferromagnetic material having a region of relatively small cross-sectional area between the magnets so that flux density is increased to the saturation point of the below ferromagnetic material at all current levels up to a maximum current level below which voltage must be maintained at an approximately constant value. Accordingly, flux is limited below this maximum current level, and since voltage is proportional to flux, the output voltage of the PMG is also limited.

In a second embodiment of the invention, a series of equally spaced radially polarized or magnetized magnets are disposed on a ferromagnetic yoke which is in turn mounted on a shaft. The yoke itself comprises flux limiting means in that it is made sufficiently thin at least in those portions between adjacent magnets to increase flux density to the saturation point for the yoke material. The result is that flux, and hence output voltage, are limited at desired levels.

The ferromagnetic material is selected to exhibit an abrupt change in permeability at the maximum design load so that flux, and hence output voltage, is controlled to no more than a particular value at current levels below design rating.

While in the above embodiments, flux limiting is accomplished by suitable dimensioning of ferromagnetic material in a magnetic circuit, it should be understood that such flux limiting can be accomplished without dimensional change by utilizing materials such as iron or iron-nickel alloys which saturate at a particular flux level.

BRIEF DESCRIPTION OF THE DRAWINGS

FIG. 3 is a fragmentary perspective view of a rotor magnetic structure for a permanent magnet generator rotor according to the present invention;

FIG. 4 is a fragmentary elevational view of the magnetic structure shown in FIG. 3;

FIG. 5 is a graph of the voltage/current characteristic for a PMG incorporating the magnetic structure shown in FIGS. 3 and 4;

BEST MODE FOR CARRYING OUT THE INVENTION

Figure 1A:
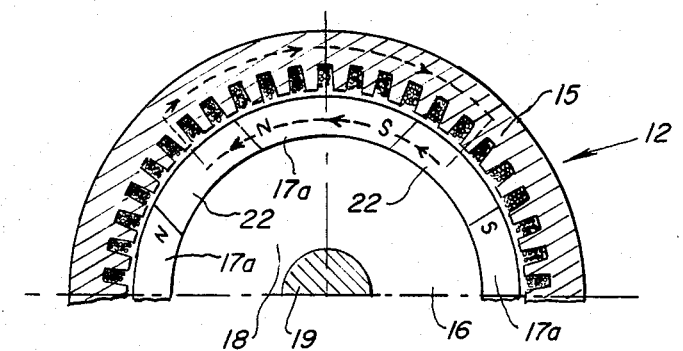
FIGS. 1A and 1B are fragmentary schematic views of prior art permanent magnet generators or PMG's, FIG. 1A disclosing a PMG utilizing tangentially magnetized magnets and FIG. 1B disclosing a PMG utilizing radially magnetized magnets.
Figure 1B:
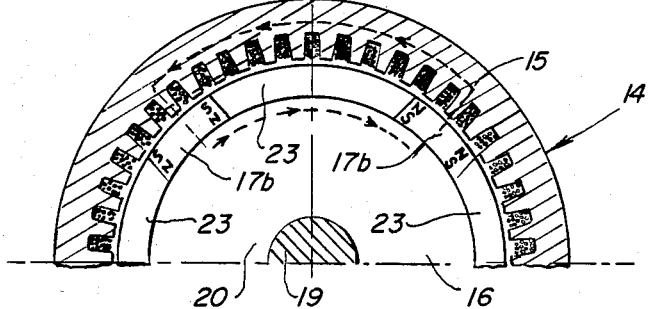

Referring now to FIGS. 1A and 1B, there is schematically illustrated a pair of prior art permanent magnet generators, or PMG's 12,14, respectively. In FIGS. 1A and 1B, common elements are designated by like reference numerals.

Each PMG 12,14 includes a stationary stator 15 and a rotor 16 which is rotatable with respect to the stator 15, as is conventional.

The rotor 16 includes either a plurality of tangentially polarized or magnetized magnets 17a in the PMG 12 or a plurality of radially polarized or magnetized magnets 17b in the PMG 14. In the PMG's illustrated in FIGS. 1A and 1B, the magnets are the high energy type having high coercive force and low flux density, such as samarium cobalt.

The magnets 17a of the PMG 12, FIG. 1A, are mounted on a hub 18 of nonmagnetic material which is in turn secured to a shaft 19 driven by a prime mover (not shown). Disposed in the spaces between magnets 17a in the PMG 12 are bodies or spacers 22 of ferromagnetic material such as soft iron laminations, or the like.

The magnets 17a, spacers 22 and stator 15 together comprise a magnetic circuit to establish flux linkages, one of which is shown by the dotted lines in FIG. 1A.

The magnets 17b of the PMG 14 are mounted on a hub 20 which is fabricated of ferromagnetic material such as soft iron or the like to form a yoke. The hub 20 is secured to the shaft and is driven by a prime mover, as noted in connection with FIG. 1A. Spacers 23 of nonmagnetic material are disposed between the magnets 17b. The magnets 17b, hub or yoke 20 and stator 15 together comprise a magnetic circuit similar to that noted in connection with FIG. 1A.

Figure 2:
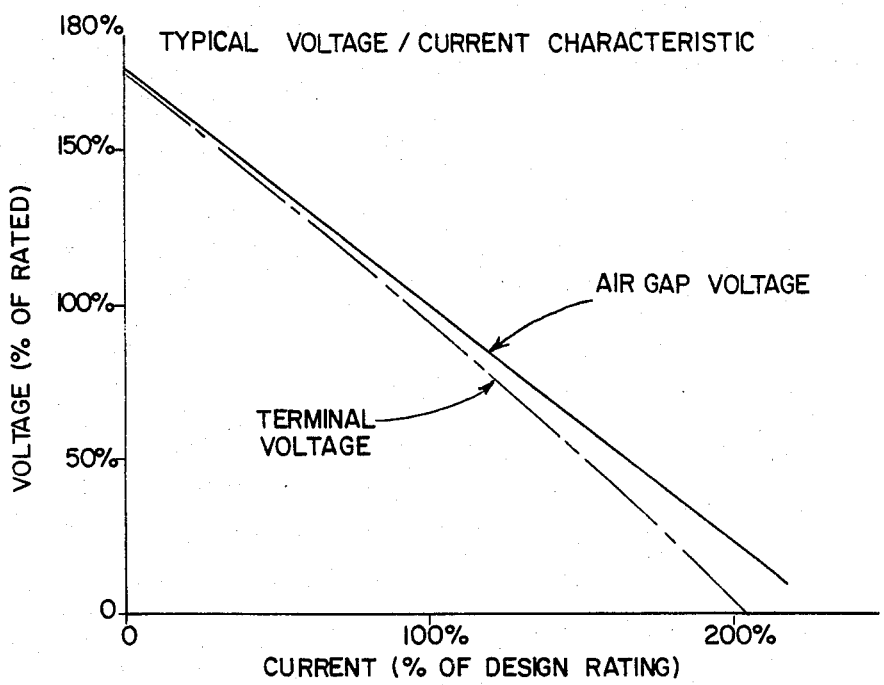
FIG. 2 is a graph of the voltage/current characteristic for the permanent magnet generators shown in FIGS. 1A and 1B.

Referring now to FIG. 2, the voltage/current characteristic for each of the PMG's 12,14 is illustrated. As shown by the solid line of FIG. 2, the voltage at the terminals of the PMG decreases approximately linearly as a function of increasing current since the magnet flux decreases with increasing load current. Likewise, the "air gap" voltage, i.e. the voltage developed by the generator without regard to the internal resistance and reactance of the stator windings also varies approximately linearly with changes in current. It can be seen from the graph of FIG. 2 that the terminal and air gap voltages increase substantially above rated voltage when the current approaches zero. This is disadvantageous since the load circuits connected to the output of the PMG must be capable of tolerating this wide fluctuation in voltage with changes in current and/or a voltage regulator must be used.

In order to minimize the dependence of output voltage with output current, the magnetic structure of the present invention effectively imposes an air gap in the magnetic circuit by causing the permeability of the ferromagnetic material in the circuit to approach that of air at a particular flux level. This is accomplished by appropriate dimensioning of the ferromagnetic material in the magnetic circuit and/or by utilizing ferromagnetic materials which inherently saturate at a given flux density as noted more specifically below.

Referring now to FIGS. 3 and 4, a magnetic structure for the rotor of a PMG utilizing tangential magnets is illustrated, only a portion of the magnetic structure being shown for purposes of clarity. The tangential magnetic structure shown in FIGS. 3 and 4 may be utilized in the PMG 12 in place of the rotor 16 shown in FIG. 1A.

As seen in FIGS. 3 and 4, a plurality of tangentially magnetized magnets 30 are secured to a nonmagnetic hub 32 which is in turn secured to a shaft 36. The magnets 30 may be secured to the hub 32 by any suitable means such that an interpole volume 38 is created between adjacent poles 30. Secured to the hub 32 in the interpole volume 38 is flux limiting means in the form of a U-shaped interpole mass 40 having a region of decreased cross-sectional area 41.

In the preferred embodiment, the magnets are of the samarium cobalt type which has high coercive force and low flux density. The material of the interpole mass 40 is selected so that the magnetics saturate the interpole mass at the desired level to achieve the proper voltage limiting. The interpole mass 40 is preferably fabricated from a solid piece of magnetically saturable ferromagnetic material, preferably a ferromagnetic alloy of iron, cobalt and vanadium with trace elements marketed by Alleghany Ludlum Steel Corporation of Pittsburgh, Pa. under the name Vanadium Permendur. The interpole mass 40 may alternatively comprise a series of laminations, as described more specifically below.

A retaining ring (not shown) may extend about the periphery of the rotor structure to maintain the placement of the various parts, if desired.

The U-shaped interpole mass 40 cross-sectional area decreases from a cross-sectional area $A_1$ adjacent one of the magnets 30a to a cross-sectional area $A_2$ midway between the magnet 30a and a second magnet 30b. This decrease in cross-sectional area results in a greater flux density in the region about area $A_2$ than in the region of area $A_1$. At a particular flux density, the ferromagnetic material of the interpole mass 40 saturates and thereby limits the flux in the series magnetic circuit comprising the magnets 30, the interpole mass 40 and the stator (not shown). As seen in FIG. 5, since output voltage is proportional to flux, the voltage of the device is likewise maintained near a predetermined level for current levels less than 100% of the rated design point. This limiting of output voltage at low current levels means that the circuitry connected to the output of the resulting PMG need not be capable of tolerating wide voltage swings as was necessary with the prior art devices. Furthermore, particularly where high energy magnetics are used such as samarium cobalt, the resulting PMG can, with less weight and size, replace the heretofore known PMG-exciter-generator arrangement.

As an example of the rotor structure shown in FIGS. 3 and 4, assume that the flux density at the maximum power point for the magnets is 4500 gauss and that Vanadium Permendur is the ferromagnetic material in the interpole volume 38. The cross-sectional areas $A_1$ and $A_2$ can be selected so that the flux density approaches 23.5 kilogauss as load current in the stator windings of the PMG drops below 100% of rated current. As load current continues to decrease and the voltage or flux increases, the Vanadium Permendur material saturates at a flux density slightly greater than 23.5 kilogauss and appear as a very long air gap in series in the magnetic circuit.

It is desirable to have the break or "knee" 42 of the curve representing air gap voltage to be as close as possible to the maximum load point. This point is a function of PMG speed and magnet volume and is also related to the saturation parameters of the ferromagnetic material of the flux limiting means.

It is possible to limit flux in the stator of the PMG rather than in the rotor; however, controlling flux density in the stator is somewhat less efficient than rotor flux control since the stator flux density is changing at a high frequency and the magnetics are driven relatively hard into saturation leading to high losses in the core material. Owing to the inherent nature of the PMG, it is generally more desirable to control flux in the rotor, where the flux is continuous and saturation has no effect on efficiency.

The embodiment shown in FIGS. 3 and 4 is preferred for the tangential magnet arrangement since the outer surface of the magnets and interpole mass is cylindrical, thereby reducing windage and unbalance problems.

Figure 6:
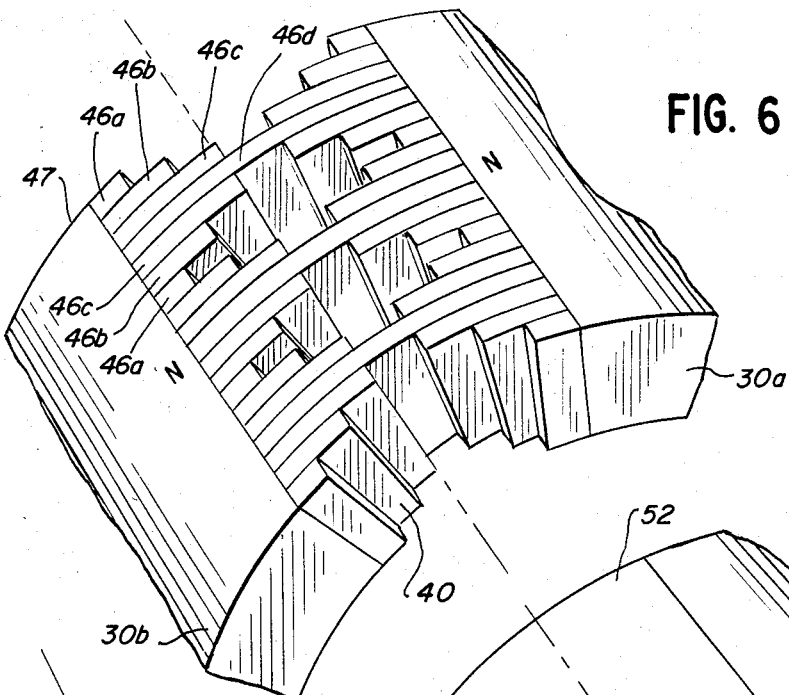
FIG. 6 is a fragmentary perspective view of a second embodiment of the invention.
Figure 7:
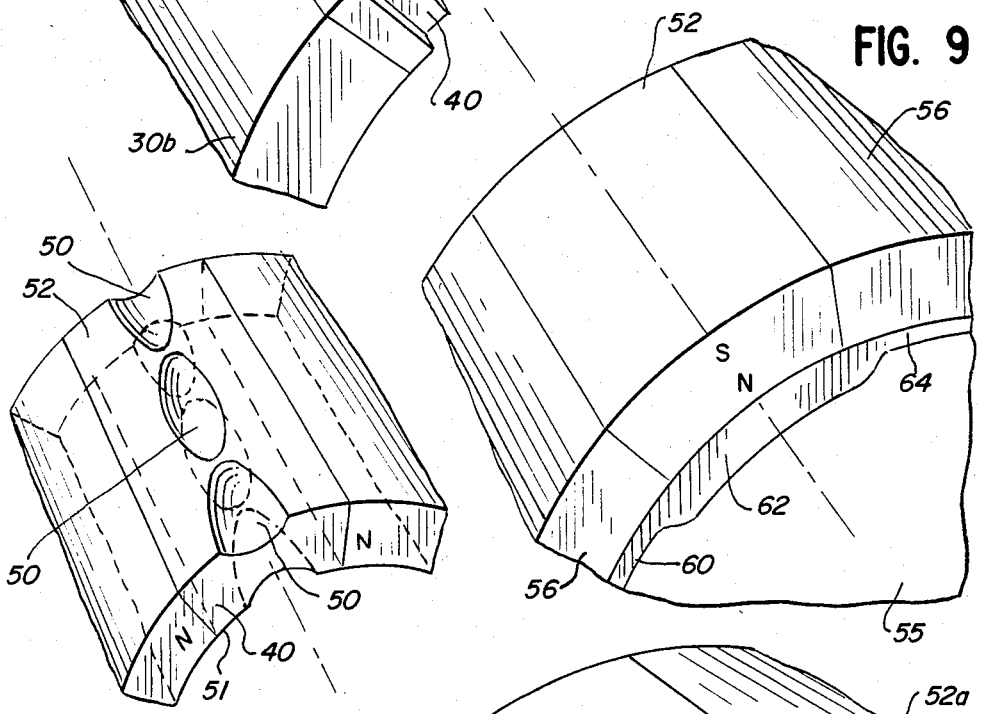
FIG. 7 is a fragmentary perspective view of a third embodiment of the invention.

Other configurations can be utilized for the interpole mass 40, such as those shown in FIGS. 6 and 7. For example, as seen in FIG. 6, the interpole mass 40 may comprise a series or stack of laminations 46 of varying length which when assembled together and placed in the interpole volume 38 act as flux limiting means in the series magnetic circuit including the magnets 30, the stator of the PMG and the laminations 46. The laminations 46 are of differing lengths or circumferential extent 46a–46d with the lamination 46a being the shortest and the lamination 46d being the longest. The laminations are bonded together in the pattern shown in FIG. 6 wherein the length or circumferential extent of successive laminations, starting at one axial end 47 of the rotor, increases up to the lamination 46d which traverses the entire distance between adjacent magnets 30a,30b. The length of successive laminations then decreases down to the shortest lamination 46a and the sequence then repeats. The laminations are preferably constructed of the Vanadium Permendur material previously described.

The lamination stack effects flux limitation due to the restriction in cross-sectional area between adjacent magnets. The number and size of laminations may be varied to achieve the proper flux saturation level.

As seen in FIG. 7, the interpole mass 40 may alternatively comprise a solid piece of ferromagnetic material, such as Vanadium Permendur, having a series of indentations or dimples 50 which accomplish a reduction in cross-sectional area which in turn limits flux and therefore output voltage at low current levels. The indentations 50 may be present on one or both of the radially inner and outer walls 51,52 respectively of the interpole mass 40, as desired.

Other means or methods of reducing magnetic flux may be utilized, such as by drilling holes, or otherwise selectively removing material to accomplish a cross-sectional area reduction.

It should also be noted that flux limitation can be accomplished without a dimensional change in cross-sectional area by utilizing materials, such as iron or iron-nickel alloys, which saturate at a particular level. In such a case, the interpole mass 40 may be configured to minimize windage losses while at the same time providing the desired voltage limitation at low current levels.

Figure 8:
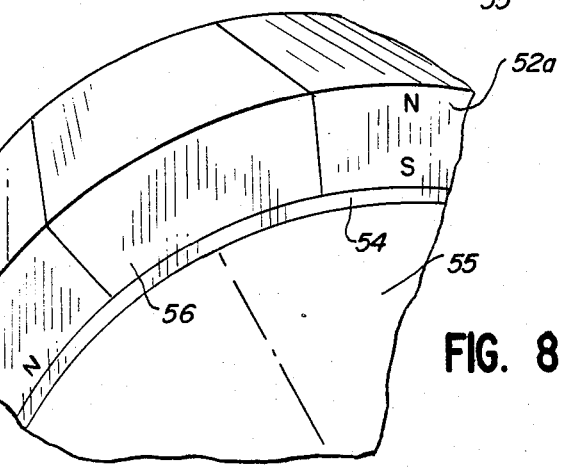
FIG. 8 is a fragmentary perspective view of a fourth embodiment of the invention for use in permanent magnet generators utilizing radially magnetized magnets.

Referring now to FIG. 8, there is shown an alternative rotor assembly of the present invention for use in PMG's having radially magnetized magnets or poles 52. As seen in FIG. 8, two of the magnets 52a,52b are secured to a yoke 54. The yoke 54 is in turn connected to a nonmagnetic hub 55 which is in turn secured to a shaft (not shown).

Disposed between the magnets 52a,52b is a nonmagnetic spacer 56. A retaining ring (not shown) may be used, as before, to maintain the placement of the various parts.

The rotor assembly may be used in the PMG 14 shown in FIG. 1B in place of the rotor 16.

In this embodiment of the invention, the yoke 54 acts as the means in which flux limiting is accomplished in the series magnetic circuit comprising the magnets 52, the yoke 54 and the stator of the PMG. The yoke material may be Vanadium Permendur, or any other suitable material. In this case, the thickness of the yoke 54 is selected to cause an increase of flux density therein to the saturation point of the yoke material so that flux, and hence output voltage, are limited. Typically, this would require that the yoke thickness be substantially less than the thickness of yokes disclosed in the prior art, such as the magnetic hub shown in FIG. 1B. This reduction in thickness may lead to a reduction in strength for the rotor assembly, and hence additional means may be necessary to strengthen the rotor assembly to prevent deformation of the yoke 54 during use.

Figure 9:
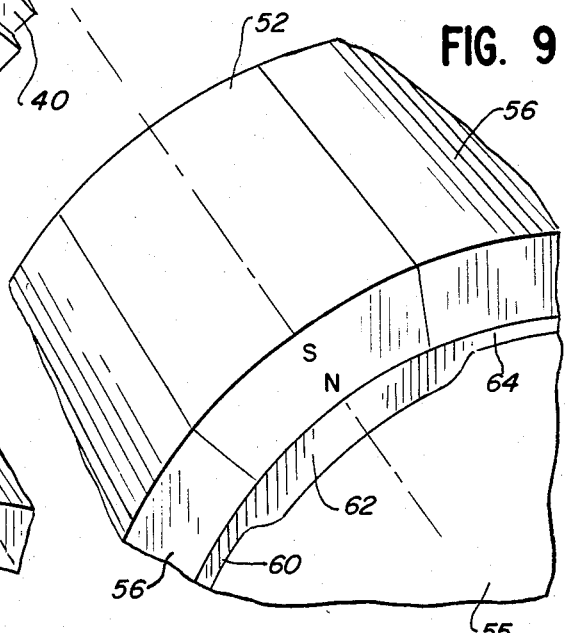
FIG. 9 is a fragmentary perspective view of a fifth embodiment of the invention.

Referring now to FIG. 9, there is shown an alternative embodiment of a rotor structure for a PMG utilizing radially magnetized magnets wherein the yoke 54 shown in FIG. 8 is replaced by a yoke 60 of varying thickness. In FIGS. 8 and 9, common elements have like reference numerals. The yoke 60 includes relatively thick portions 62 and thin portions 64. The thin portion 64 limits flux, and hence output voltage, as was noted with respect to the embodiment shown in FIG. 8. The thick portions 62 provide additional support for the magnetic structure on the yoke 60 to increase the strength and hence structural integrity of the rotor assembly. In this case, the additional strengthening means which may be necessary with the embodiment of FIG. 8 may be dispensed with in certain applications.

Analogous to the previous embodiments, the flux limitation may be accomplished in various other ways in the yoke 54 or 60, such as by drilling holes or otherwise removing material at appropriate spaces in the series magnetic circuit, or by utilizing a material which saturates at a particular level, as was noted with respect to the embodiments utilizing tangential magnets noted above.

We claim:

1. In a permanent magnet generator having a rotor rotatable within a stator, the stator having windings which develop output voltage in response to rotation of the rotor relative thereto, the output voltage being dependent upon the level of current in the stator windings, a magnetic structure for reducing the dependence of output voltage on the current in the stator windings, comprising:

a magnet on the rotor which develops magnetic flux linking the stator windings;

means connected in a magnetic circuit with the magnet for limiting the flux developed thereby to maintain the output voltage of the permanent magnet machine near a desired level substantially independent of current in the stator windings, wherein the flux limiting means includes a body of magnetically saturable material having means for increasing the flux density therein to a saturation point to thereby limit flux; and a second magnet spaced apart from the aforementioned magnet and wherein the flux limiting means includes a plurality of magnetically saturable laminations of different lengths, only some of the laminations traversing the entire space between the magnets.

2. In a permanent magnet generator having a rotor rotatable within a stator, the stator having windings which develop output voltage in response to rotation of the rotor relative thereto, the output voltage being dependent upon the level of current in the stator windings, a magnetic structure for reducing the dependence of output voltage on the current in the stator windings, comprising:

a magnet on the rotor which develops magnetic flux linking the stator windings;

means connected in a magnetic circuit with the magnet for limiting the flux developed thereby to maintain the output voltage of the permanent magnet machine near a desired level substantially independent of current in the stator windings; and
wherein the rotor includes a ferromagnetic yoke disposed about the hub and wherein the magnet is radially polarized and connected in a magnetic series circuit with the yoke.

3. The permanent magnet generator of claim 2, wherein the yoke thickness is such that the yoke material saturates at a particular flux density so that the output voltage is limited to a point slightly greater than the output voltage at rated current and voltage for the machine.

4. The permanent magnet generator of claim 2, wherein the yoke includes thick and thin portions, the thin portions limiting flux at a desired level.

5. A permanent magnet generator having means for limiting output voltage at current levels below 100% of design rating, comprising:
   a stator having stator windings which develop output voltage;
   a rotor disposed within the stator and rotatable with respect thereto, the rotor having a magnetic structure including a plurality of spaced-apart magnets which develop magnetic flux and means connected in a magnetic circuit with the magnets for limiting the flux therefrom to limit the output voltage at a desired level, the flux limiting means including a body of ferromagnetic material disposed between the magnets including means for increasing flux density to a point of saturation to thereby limit the output voltage wherein the body of ferromagnetic material includes a plurality of laminations of different lengths, only some of the laminations traversing the entire space between adjacent magnets.

6. A permanent magnet generator having means for limiting output voltage at current levels below 100% of design rating, comprising:
   a stator having stator windings which develop output voltage;
   a rotor disposed within the stator and rotatable with respect thereto, the rotor having a magnetic structure including a plurality of spaced-apart magnets which develop magnetic flux and means connected in a magnetic circuit with the magnets for limiting the flux therefrom to limit the output voltage at a desired level; and
   wherein the rotor includes a nonmagnetic hub, a ferromagnetic yoke disposed about the hub and wherein the magnets are radially polarized and connected in a magnetic series circuit with the yoke.

7. The permanent magnet generator of claim 6, wherein the yoke thickness is such that the yoke material saturates at a desired flux density so that the output voltage is limited below a predetermined voltage.

8. The permanent magnet generator of claim 6, wherein the yoke includes thin portions, the thin portions limiting flux at a desired level.

9. In a permanent magnet generator, or PMG, for delivering current to a load, the PMG having a rotor and a stator having windings, the rotor being rotatable relative to the stator to develop output voltage which varies as a function of load current, a magnetic structure on the rotor for limiting output voltage at low load current levels, comprising:
   a plurality of spaced-apart tangentially magnetized magnets for developing magnetic flux; and
   means disposed in the space between adjacent magnets for establishing a magnetic circuit therewith including a region of decreased cross-sectional area for increasing flux density to a point of saturation to thereby limit the output voltage.

10. In a permanent magnet generator, or PMG, for delivering current to a load, the PMG having a rotor and a stator having windings, the rotor being rotatable relative to the stator to develop output voltage which varies as a function of load current, a magnetic structure on the rotor for limiting output voltage at low load current levels, comprising:
   a plurality of spaced-apart radially magnetized magnets for developing magnetic flux; and
   a ferromagnetic yoke disposed on the rotor connected in a magnetic series circuit with the plurality of magnets including at least one portion sufficiently thin so that the yoke material in such portion saturates at a particular flux density in turn causing the output voltage to be limited to a point below a particular voltage.

* * * * *